(12) United States Patent
McColloch

(10) Patent No.: US 7,543,997 B1
(45) Date of Patent: Jun. 9, 2009

(54) ELECTROMAGNETIC INTERFERENCE (EMI) SYSTEM AND METHOD FOR SEALING FIBER OPTIC PORTS IN AN OPTICAL TRANSCEIVER MODULE

(75) Inventor: Laurence R. McColloch, Santa Clara, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/027,393

(22) Filed: Feb. 7, 2008

(51) Int. Cl.
  *G02B 6/36* (2006.01)
(52) U.S. Cl. .......................................... 385/92; 385/88
(58) Field of Classification Search .............. 385/88–92
  See application file for complete search history.

(56) References Cited

U.S. PATENT DOCUMENTS

| | | | |
|---|---|---|---|
| 6,856,769 B1 * | 2/2005 | Steffensen et al. .......... | 398/135 |
| 7,281,864 B2 * | 10/2007 | Mizue et al. .................. | 385/92 |
| 7,314,318 B2 * | 1/2008 | Anderl et al. ................. | 385/92 |
| 2003/0201111 A1 * | 10/2003 | Jensen et al. ............ | 174/35 GC |
| 2007/0110374 A1 * | 5/2007 | Oki et al. ...................... | 385/89 |
| 2007/0280606 A1 * | 12/2007 | Nelson et al. ................. | 385/92 |

\* cited by examiner

*Primary Examiner*—Ellen Kim

(57) ABSTRACT

An EMI system is provided for use with an optical transceiver module. The EMI system comprises electrically conductive spring fingers that are movably disposed in a slot formed in the transceiver module housing such that a part of each spring finger is in contact with a part of the metallic transceiver module housing and such that a part of each spring finger is in contact with a part of one of the metallic ports. Because the spring fingers are movable within the slot formed in the module housing, the spring fingers maintain contact with the housing and with the ports during movement of the ports, i.e., as the ports float. Because the ports are allowed to float without causing the contact between the ports and the spring fingers or between the spring fingers and the housing to be lost, the ports automatically align with the connectors when the connectors are connected to the ports. Thus, the need for performing an active alignment process to align the ports with the connectors is avoided.

21 Claims, 4 Drawing Sheets

ELECTROMAGNETIC INTERFERENCE (EMI) SYSTEM AND METHOD FOR SEALING FIBER OPTIC PORTS IN AN OPTICAL TRANSCEIVER MODULE

TECHNICAL FIELD OF THE INVENTION

The invention relates to optical transceiver modules. More particularly, the invention relates to an electromagnetic interference (EMI) system for use in an optical transceiver module for providing EMI sealing for the fiber optic ports.

BACKGROUND OF THE INVENTION

In optical communications networks, optical transceiver modules are used to transmit and receive optical signals over optical fibers. On the transmit side of a transceiver module, a light source (e.g., a laser diode) generates amplitude modulated optical signals that represent data, which are received by an optics system of the transceiver module and focused by the optics system into an end of a transmit optical fiber. The signals are then transmitted over the transmit fiber to a receiver node of the network. On the receive side of the transceiver module, the optics system of the transceiver module receives optical signals output from an end of a receive optical fiber and focuses the optical signals onto an optical detector (e.g., a photodiode), which converts the optical energy into electrical energy.

The transmit and receive fiber cables have connectors on their ends, often LC connectors, that are adapted to mate with transmit and receive receptacles, respectively, formed in the transceiver module. A variety of optical transceiver module configurations are used in optical communications network. Some optical transceiver modules have multiple transmit receptacles and multiple receive receptacles for connecting multiple receive and transmit fiber cables to the module. Some transceiver modules having a single receive receptacle and a single transmit receptacle arranged side by side for connecting a single receive fiber cable and a single transmit fiber cable, respectively, to the transceiver module.

The transceiver modules themselves also have mating elements on them that are adapted to mate with mating elements formed on the cages. The cages are contained in racks, and each rack typically includes many cages that are arranged in very close proximity to one another. Each of these cages is configured to receive a transceiver module on the front side of the rack through a front panel of the rack. The transceiver modules are configured so that they may be inserted into and removed from the cages. The modules typically include latching mechanisms that couple to mating features on the cages when the modules are inserted into the cages. In order to remove a module from a cage, the module must be de-latched to decouple the latching mechanism from the features on the cage, which can be challenging when the modules are spaced closely together in the racks.

A variety of different latching mechanism configurations are used on optical transceiver modules. In general, latching mechanisms used on optical transceiver modules include spring loading elements that maintain the latching mechanisms in their locked positions via spring forces. These types of latching mechanisms typically include a bail that is moved to a locked position in order to latch the module to the cage and that is moved to an unlocked position in order to de-latch the module from the cage. When the bail is in the locked position, a latch lock pin extends through an opening formed in the cage to prevent movement of the module relative to the cage and relative to the LC connectors connected to the transmit and receive receptacles. When the bail is in the locked position, the latch lock pin is retracted from the opening formed in the cage, making it possible to remove the module from and insert the module into the cage.

In general, the transmit and receive receptacles of optical transceiver modules are areas in the transceiver modules that allow electromagnetic interference (EMI) to escape from the transceiver modules. The Federal Communications Commission provides standards that limit the amount of electromagnetic radiation that may emanate from unintended sources. A variety of techniques and designs are used to shield potential EMI openings in optical transceiver modules in order to limit the amount of EMI radiation that may pass through the openings and thereby propagate into the environment outside of the modules. The transmit and receive receptacles contain portions of transmit and receive fiber optic ports, respectively, that mate with the transmit and receive connectors, respectively, when the connectors are plugged into the receptacles. In some known optical transceiver module designs, the ports are made of metal in order to help shield EMI. Although the use of metal ports helps to shield EMI, the use of metal ports is insufficient, in and of itself, to provide an effective EMI solution.

In order to effectively shield EMI, the metal ports need to be in consistent electrical contact with the metal housing of the transceiver module. The effective size of an EMI aperture is generally equivalent to the longest single dimension of non-contact between the port and the housing. If, for example, parts of the port along its circumference are not in contact with the housing, the EMI aperture size will be equal to the largest circumferential part over which the port and the housing are not in contact with each other. Often times, electrically conductive adhesive is used to fill in gaps between the ports and the housing to provide continuous conductive contact between the ports and the housing.

Because metal ports are relatively expensive, the transmit and receive ports are sometimes made of plastic. When the ports are made of plastic, the ports essentially constitute EMI openings that are very large in size. Although electrically conductive adhesive is normally used to seal the ports and provide EMI shielding, the EMI apertures that result when plastic ports are used are still relatively large in size. EMI aperture size is inversely related to the frequency of the transceiver module. Therefore, for transceivers that operate at low frequencies have maximum allowable EMI aperture sizes that are larger than transceivers that operate at higher frequencies. For example, a transceiver that operates at 1 Gigabits per second (Gb/s) can have an EMI aperture that is twice as large as that of a transceiver that operates at 10 Gb/s. Consequently, plastic ports generally are not suitable for use with transceivers that operate at high frequencies (e.g., 10 Gb/s).

Another problem with known transceiver module designs that rely on covering the ports with electrically conductive adhesive to provide adequate EMI shielding is that the adhesive prevents the ports from floating. Floating port designs are sometimes used because they allow some movement of the ports within the receptacles. When the connectors are plugged into the receptacles, the floating ports automatically align with the connectors, thereby obviating the need to use active alignment processes to align the ports with the connectors. Because the use of electrically conductive adhesive generally prevents the ports from floating, an active alignment process is typically performed while the adhesive is being applied, which is difficult and time consuming.

Accordingly, a need exists for an EMI system that is satisfactory at sealing fiber optic ports of an optical transceiver module. A need also exists for an EMI system that is satisfactory at sealing fiber optic ports of an optical transceiver module, and which also allows the ports to float.

SUMMARY OF THE INVENTION

An optical transceiver module and an EMI system and method for use in the optical transceiver module are provided. The EMI system comprises at least a first EMI device being configured to be movably disposed in a housing of the optical transceiver module. The housing comprising an electrically conductive material. The first EMI device comprises an electrically conductive first spring structure. When the first EMI device is movably disposed in the module housing, multiple respective locations on the spring structure are in contact with multiple respective locations on the module housing to provide multiple respective electrical pathways between the spring structure and the module housing. The module housing has at least a first port holder formed therein that is configured to receive and hold a first fiber optic port. The first fiber optic port comprises an electrically conductive material. When the first EMI device is movably disposed in the module housing and the first fiber optic port is held in the first port holder, multiple locations on the first spring structure are in contact with multiple respective locations on the module housing to provide multiple respective electrical pathways between the first spring structure and the port. The first spring structure is loaded via the contact between the first spring structure and the module housing. The loading of the first spring structure ensures that contact is maintained between the first spring structure and the module housing and between the first spring structure and the first port.

The method comprises providing a transceiver module housing, the housing comprising an electrically conductive material and having at least a first slot formed therein, movably disposing at least a first EMI device in the first slot formed in the module housing, and placing at least a first fiber optic port in a first port holder formed in the module housing. The first port comprises electrically conductive material. The first EMI device comprises an electrically conductive first spring structure. Multiple respective locations on the spring structure are in contact with multiple respective locations on the module housing and with multiple respective locations on the first port. The first spring structure is loaded via the contact between first spring structure and the module housing. This loading of the first spring structure ensures that contact is maintained between the first spring structure and the module housing and between the first spring structure and the first port.

These and other features and advantages of the invention will become apparent from the following description, drawings and claims.

DETAILED DESCRIPTION OF AN ILLUSTRATIVE EMBODIMENT

In accordance with various embodiments that will be described herein, an optical transceiver module is provided that has an EMI system for sealing the fiber optic ports in an optical transceiver module to eliminate or at least reduce EMI emissions emanating from the ports. In accordance with an embodiment, the EMI system comprises electrically conductive spring fingers that are movably disposed in a slot in the transceiver module housing such that a part of each spring finger is in contact with a part of the metallic transceiver module housing and such that a part of each spring finger is in contact with a part of one of the metallic ports. Because the spring fingers are movable within the slot formed in the module housing, the spring fingers maintain contact with the housing and with the ports while also allowing the ports to float. Because the ports are allowed to float, the ports, which are movably secured in the receptacles with gimbals to allow some movement of the ports, the ports automatically align with the connectors when the connectors are plugged into the receptacles. Thus, the need for performing an active alignment process to align the ports with the connectors is avoided.

Figure 1:
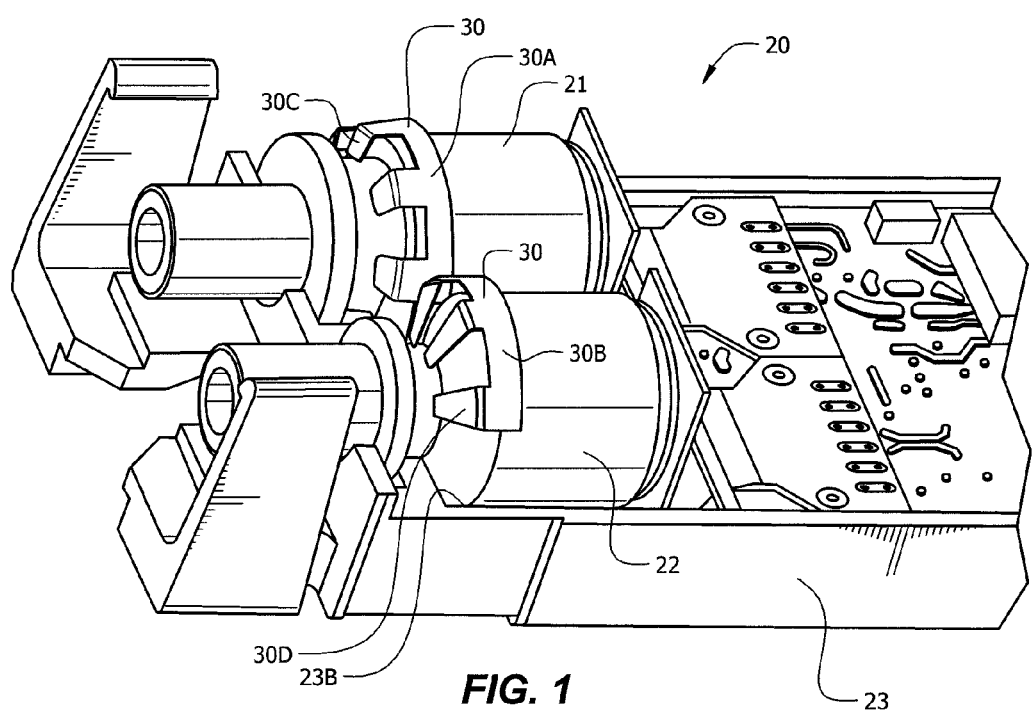
FIG. 1 illustrates a perspective top view of a portion of an optical transceiver module having the EMI system in accordance with an illustrative embodiment for sealing the ports of the transceiver module.

FIG. 1 illustrates a perspective top view of a portion of an optical transceiver module 20 having the EMI system 30 in accordance with an illustrative embodiment for sealing the ports 21 and 22 of the transceiver module 20. The port 21 corresponds to the transmit port and the port 22 corresponds to the receive port. The ports 21 and 22 are made of an electrically conductive material, such as metal, for example, and are movably held in port holder areas formed in the module housing 23. The EMI system 30 is made up of transmit port EMI device 30A and of a receive port EMI device 30B. The EMI devices 30A and 30B are made of an electrically conductive material that is also compliant to enable the EMI devices 30A and 30B to act as spring structures that are electrically conductive. A suitable electrically conductive material for the EMI devices 30A and 30B is sheet metal. The transceiver module housing 23 is also made of an electrically conductive material, such as metal, for example.

The EMI devices 30A and 30B are each made up of a circular band of spring fingers 30C and 30D, respectively. The EMI devices 30A and 30B extend around the circumferences of the ports 21 and 22 on the forward areas of the ports 21 and 22 near where the ports 21 and 22 couple with the respective connectors (not shown). Only the upper portions of the EMI devices 30A and 30B are shown in FIG. 1. The EMI devices 30A and 30B are received in slots formed in the upper and lower portions of the transceiver module housing 23. Only a portion of one of the slots, 23B, formed in the lower portion of the housing 23 is visible in the perspective view of the housing 23 shown in FIG. 1. A similar slot 23A (FIG. 2) is formed in the upper and lower portions of the housing 23 on the transmit side of the housing 23 for receiving the EMI device 30A.

The slots 23A and 23B are formed in the upper and lower portions of the housing 23 and the spring fingers 30C and 30D are shaped and sized such that the spring fingers 30C and 30D are loaded when they are placed in the slots 23A and 23B. The loading of the spring fingers 30C and 30D causes them to be maintained in continuous contact with the module housing 23 and the ports 21 and 22 while also providing the EMI devices 30A and 30B with some freedom to move within the slots 23A and 23B. Providing the EMI devices 30A and 30B with some freedom to move within the slots 23A and 23B allows the ports 21 and 22 to float within their respective receptacles. This allows the ports 21 and 22 to align with their respective connectors when the connectors are plugged into the respective receptacles. Consequently, it is unnecessary to use an active alignment process to align the ports with the connectors.

Figure 2:
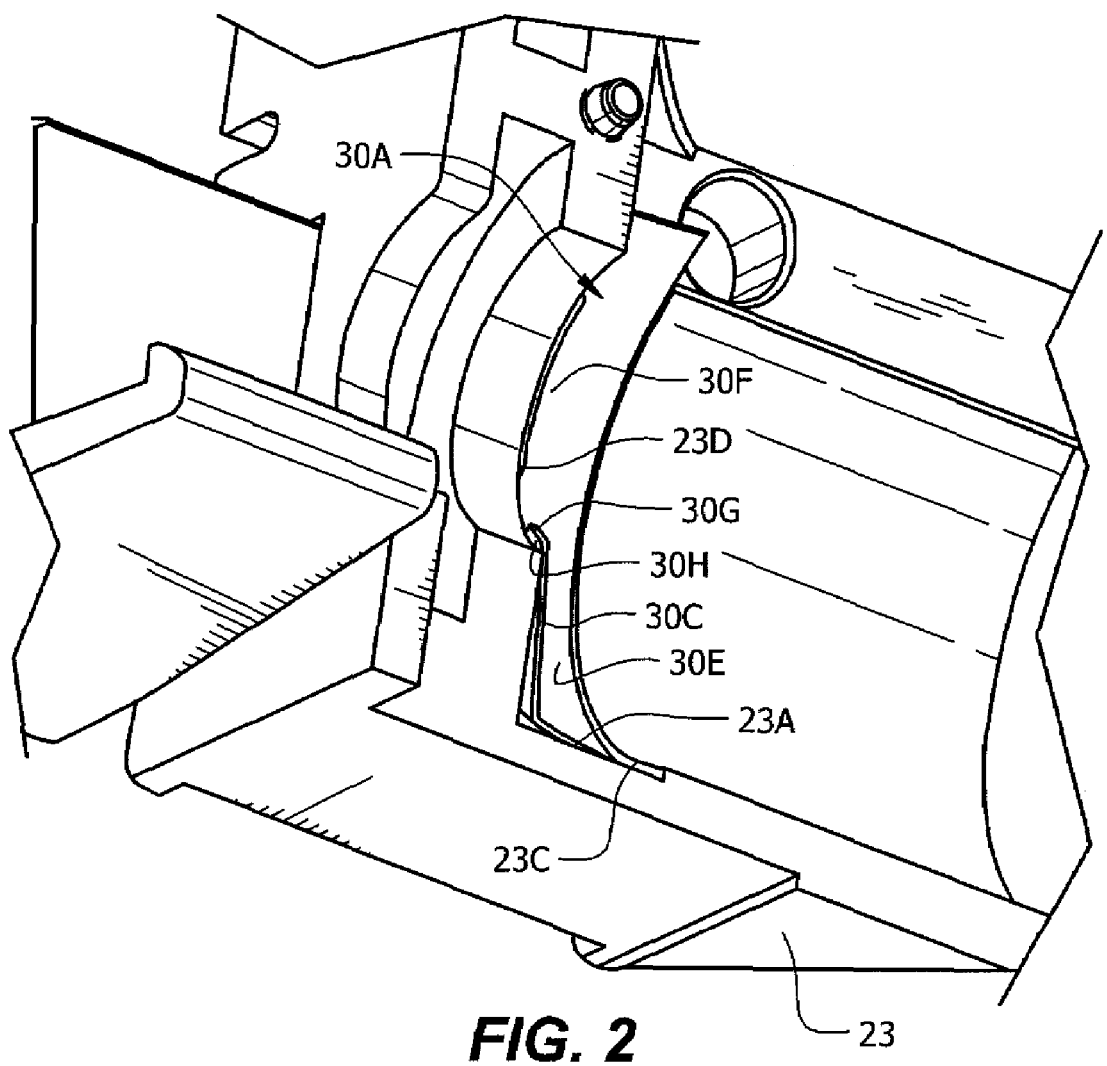
FIG. 2 illustrates a perspective view of the transmit side of the top portion of the housing of the transceiver module, which is configured to attach to the lower portion of the housing shown in FIG. 1.

FIG. 2 illustrates a perspective view of the transmit side of the top portion of the housing 23, which is configured to attach to the lower portion of the housing 23 shown in FIG. 1. The slot 23A formed in the upper portion of the housing 23 is shown in FIG. 2. The EMI device 30A is shown disposed within the slot 23A. The EMI device 30A has an upper band portion 30E that is in contact with a circumferential edge 23C of the slot 23A formed in the housing 23. The spring fingers 30C extend from a lower band portion 30F of the EMI device. Each of the spring fingers 30C has a distal end 30G that is in contact with the port 21 (FIG. 1), as will be described below in more detail with reference to FIG. 3. A lower surface 30H of each spring finger 30C is in contact with another circumferential edge 23D of the housing 23. The spring fingers 30C are periodically spaced at predetermined spatial intervals such that the ends 30G of the spring fingers 30C make contact with port 21 at predetermined, periodically spaced intervals. The spacing between the ends 30G depends on the frequency of the optical transceiver module 20. For relatively high frequencies (e.g., 10 Gb/s), the spacing between the ends 30G is typically between about 1 and 2 millimeters (mm). The EMI devices 30A and 30B essentially operate as waveguides beyond cutoff for the intended frequencies of the transceiver module.

Figure 3:
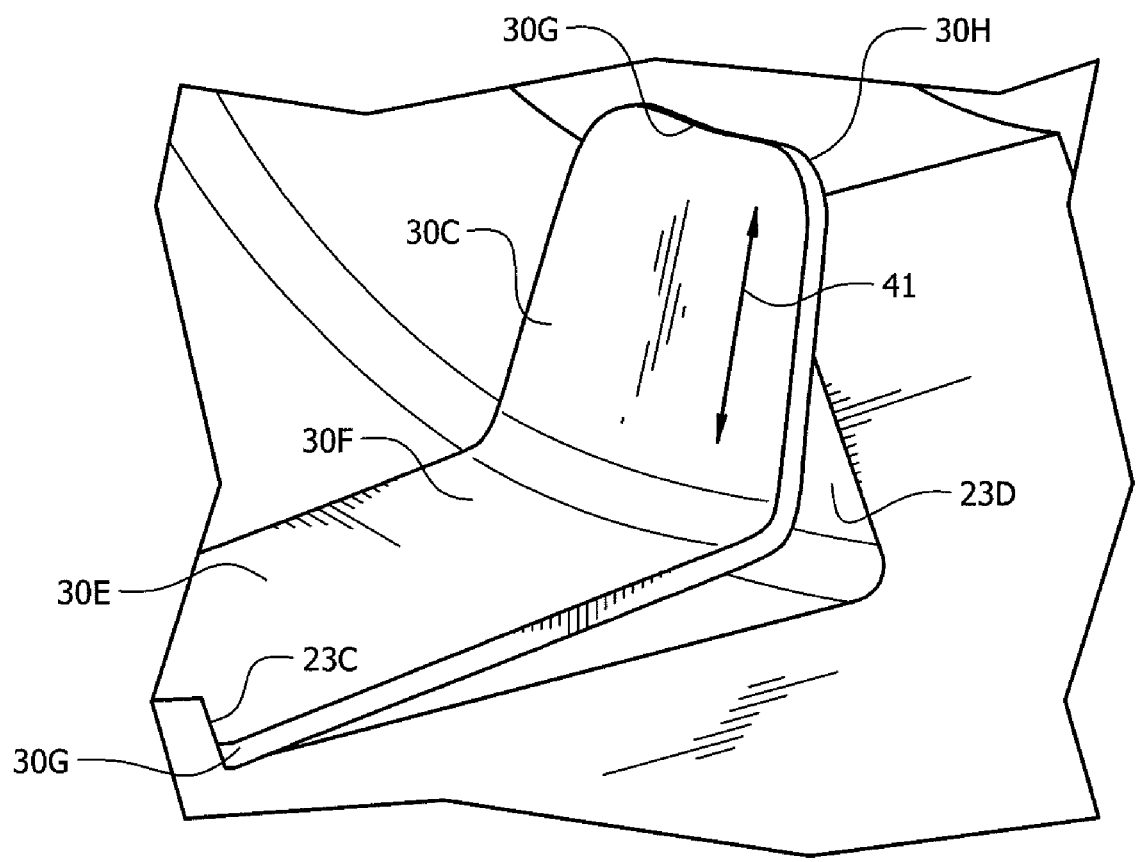
FIG. 3 illustrates an enlarged perspective view of a portion of the EMI device shown in FIG. 2, which shows the contact between one of the EMI devices and the module housing, and which shows the locations on the EMI device that are in contact with the port when the port is set in the housing.

FIG. 3 illustrates an enlarged perspective view of a portion of the EMI device 30A shown in FIG. 2, which shows the contact between the EMI device 30A and the module housing 23 and between the locations of the EMI device 30A that contact the port when the port is set in the housing 23. When the EMI device 30A is disposed within the slots 23A and the port 21 is installed in the receptacle, the following are in contact: the upper band portion 30E of the EMI device 30A is in contact with the circumferential edge 23C of the housing 23; the bottom surface 30H of the EMI device 30A is in contact the other circumferential edge 23D of the housing 23, and the ends 30G of the spring fingers 30C are in contact with the port (not shown).

The spring fingers 30C have freedom to move in the direction indicated by arrow 41, i.e., toward and away from the receptacle in which the port 21 is held. Contact is maintained between the housing 23 and the EMI device 30A and between the EMI device 30A and the port 21 even when there is movement of the spring fingers 30C. This freedom of motion allows the port 21 to gimbal without contact being lost between the spring fingers 30C and the housing 23 and between the spring fingers 30C and the port 21. In addition, the length of the spring finger 30C is great compared to the length of the electrical pathway from the housing 23 to the spring finger 30C and from the spring finger 30C to the port 21. The length of the electrical pathway is the length from the location where the lower surface 30H of the spring finger 30C is in contact with the housing edge 23D to the location where the end 30G of the spring finger 30C is in contact with the port 21. The short length of this electrical pathway provides improved EMI performance. The length of the of the EMI device 30A is the length from the location where housing edge 23C is in contact with the upper band portion 30E, through the device 30A to the location where the housing edge 23D is in contact with the lower surface 30H of the spring finger 30C. This relatively long spring length allows the EMI device 30A to have a suitable soft spring constant and long conformance travel. In addition, using the housing edge 23D rather than a flat surface of the housing 23 provides increased pressure on the EMI device 30A that results in excellent contact reliability.

The EMI device 30B is essentially identical to the EMI device 30A described above with reference to FIGS. 2 and 3, except that the spring fingers 30D of the EMI device 30B are slightly longer than the spring fingers 30C of EMI device 30A due to differences between the sizes of the transmit and receive port 21 and 22, respectively. Because the EMI devices 30A and 30B are essentially compliant springs, the transceiver modules can be manufactured with less stringent manufacturing tolerances, which provides several advantages, including reduced costs. Therefore, the EMI system 30 (FIG. 1) provides several advantages, including, for example, effective EMI sealing while allowing the ports to float, short electrical pathways that improve EMI performance, and a compliant EMI shielding structure that allows transceiver modules to be manufactured with greater manufacturing tolerances.

Figure 4:
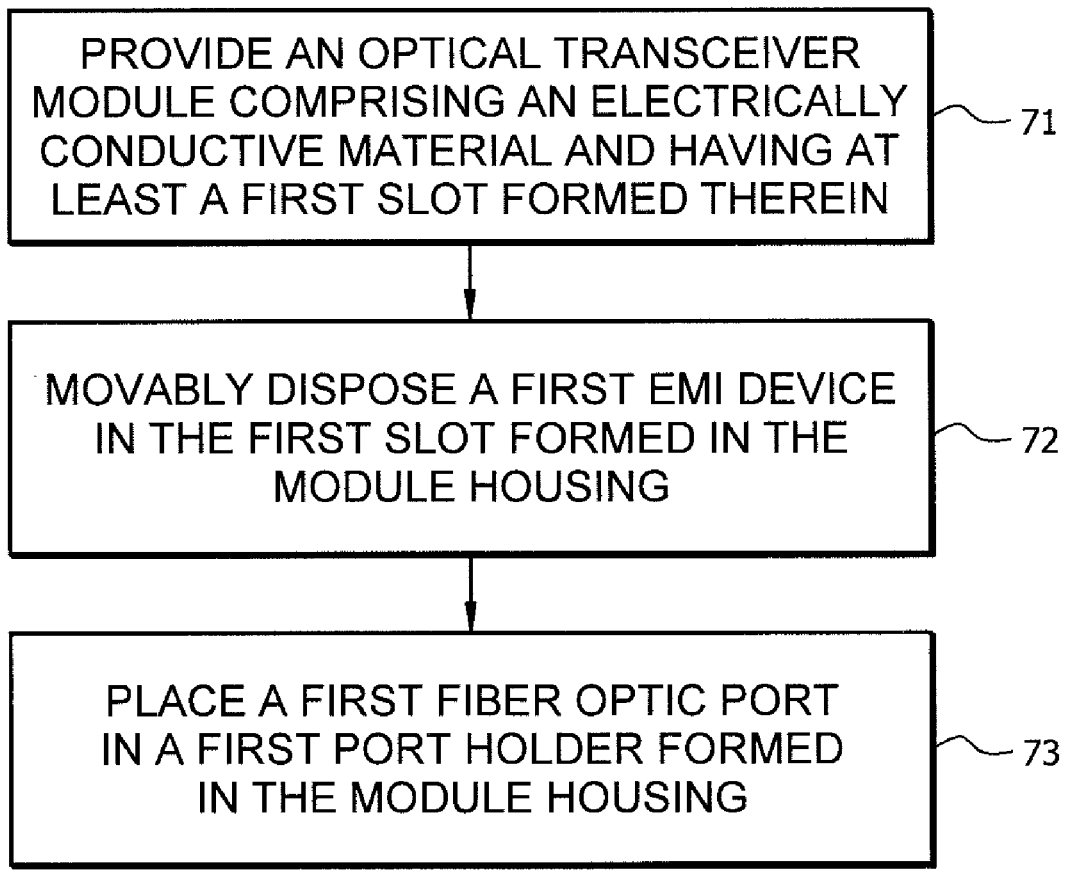
FIG. 4 illustrates a flowchart that represents the method of the invention in accordance with an illustrative embodiment for providing ports of an optical transceiver module with EMI shielding.

FIG. 4 illustrates a flowchart that represents the method for providing EMI shielding for fiber optic ports in an optical transceiver module in accordance with an illustrative embodiment. The method is as follows. An optical transceiver module housing comprising an electrically conductive material (e.g., metal) and having at least a first slot formed therein is provided, as indicated by block 71. A first EMI device is movably disposed in the slot formed in the module housing, as indicated by block 72. The EMI device comprises a spring structure. A first fiber optic port is placed in a first port holder formed in the module housing, as indicated by block 73.

When the EMI device and the port have been set in the housing, multiple respective locations on the spring structure of the EMI device are in contact with multiple respective locations on the module housing and with multiple respective locations on the port. The spring structure is loaded via the contact between spring structure and the module housing. This loading of the spring structure ensures that contact is maintained between the spring structure and the module housing and between the spring structure and the first port.

It should be noted that the invention has been described with reference to a few illustrative embodiments for the purposes of demonstrating the principles and concepts of the invention and the manner in which they may be implemented. The invention is not limited to these embodiments, but rather, a variety of modifications may be made to these embodiments without deviating from the scope of the invention. For example, although the entire EMI devices 30A and 30B have been described as having a particular shape and design, other shapes and designs may be used that enable the goals of the invention to be achieved. Also, although the embodiments have been described with reference to a duplex optical transceiver module, the invention applies equally to simplex transceiver modules that have only a single transmit or receive port, in which case only one of the EMI devices 30A or 30B would be needed. Those skilled in the art will understand the manner in which modifications may be made to the embodiments described herein and that all such modifications are within the scope of the invention.

What is claimed is:

1. An electromagnetic interference (EMI) system for use with an optical transceiver module, the EMI system comprising:

at least a first EMI device being configured to be movably disposed in a housing of the optical transceiver module, the housing comprising an electrically conductive material, the first EMI device comprising an electrically conductive first spring structure, wherein when the first EMI device is movably disposed in the module housing, multiple respective locations on the spring structure are in contact with multiple respective locations on the module housing to provide multiple respective electrical pathways between the spring structure and the module housing, the module housing having at least a first port holder formed therein, the first port holder being configured to receive and hold a first fiber optic port, the first fiber optic port comprising an electrically conductive material; and wherein when the first EMI device is movably disposed in the module housing and the first fiber optic port is held in the first port holder, multiple locations on the first spring structure are in contact with multiple respective locations on the module housing to provide multiple respective electrical pathways between the spring structure and the port, and when the first spring structure is movably disposed within the module housing, the first spring structure is loaded via the contact between first spring structure and the module housing, the loading of the first spring structure ensuring that contact is maintained between the first spring structure and the module housing and between the first spring structure and the first port, wherein the first port holder is configured to hold the first port in a floating arrangement that provides the first sort with some freedom to move, and wherein when the first EMI device is movably disposed in the module housing and the first port is held in the first port holder, movement of the port in the first port holder results in movement of the first EMI device in the module housing.

2. The EMI system of claim 1, wherein the first EMI device comprises:
   a circular band having an upper band portion and a lower band portion; and
   a plurality of spring fingers extending from the lower band portion of the circular band, each spring finger having a distal end portion, and wherein when the first EMI device is movably disposed in the module housing and the first port is held in the first port holder, the upper band portion abuts a first edge of a slot formed in the module housing and the distal ends of each of the spring fingers abut the first port.

3. The EMI system of claim 2, wherein each of the spring fingers has at least a first fold formed therein, and wherein a portion of each spring finger located between the first fold formed in the spring finger and the distal end of the spring finger abuts a second edge of the slot formed in the module housing.

4. The EMI system of claim 3, wherein when the first EMI device is movably disposed in the module housing and the first port is held in the first port holder, movement of the port in the port holder results in movement of at least one of the spring fingers, wherein movement of the spring finger is in a direction toward or away from the second edge of the slot formed in the housing.

5. The EMI system of claim 3, wherein when the first EMI device is movably disposed in the module housing and the first port is held in the first port holder, respective electrical pathways exist between the portion of each spring finger that abuts the second edge of the slot formed in the module housing and the distal end of each spring finger in contact with the first port.

6. The EMI system of claim 1, wherein the spring fingers are spaced apart from each other at predetermined spatial intervals such when the first EMI device is movably disposed in the module housing and the first port is held in the first port holder, the distal ends of the respective spring fingers are in contact with respective locations on the port, wherein the respective locations on the port that are in contact with the distal ends of the spring fingers are spaced apart from each other at predetermined spatial intervals, and wherein the predetermined spatial intervals between the locations on the port that are in contact with the distal ends of the spring fingers are selected so that the first EMI device acts as a waveguide beyond cutoff for the operating frequency of the optical transceiver module.

7. The EMI system of claim 1, further comprising:
   at least a second EMI device being configured to be movably disposed in the housing of the optical transceiver module adjacent the first EMI device, the second EMI device comprising an electrically conductive second spring structure, wherein when the second EMI device is movably disposed in the module housing, multiple respective locations on the second spring structure are in contact with multiple respective locations on the module housing to provide multiple respective electrical pathways between the second spring structure and the module housing, the module housing having at least a second port holder formed therein, the second port holder being configured to receive and hold a second fiber optic port, the second fiber optic port comprising an electrically conductive material; and wherein when the second EMI device is movably disposed in the module housing and the second fiber optic port is held in the second port holder, multiple locations on the second spring structure are in contact with multiple respective locations on the module housing to provide multiple respective electrical pathways between the second spring structure and the second port, and when the second spring structure is movably disposed within the module housing, the second spring structure is loaded via the contact between second spring structure and the module housing, the loading of the second spring structure ensuring that contact is maintained between the second spring structure and the module housing and between the second spring structure and the second port.

8. The EMI system of claim 7, wherein the second port holder is configured to hold the second port in a floating arrangement that provides the second port with some freedom to move, and wherein when the second EMI device is movably disposed in the module housing and the second port is held in the second port holder, movement of the second port in the second port holder results in movement of the EMI device in the module housing.

9. The EMI system of claim 8, wherein the second EMI device comprises:
   a circular band having an upper band portion and a lower band portion; and
   a plurality of spring fingers extending from the lower band portion of the circular band of the second EMI device, each spring finger having a distal end portion, and wherein when the second EMI device is movably disposed in the module housing and the second port is held in the second port holder, the upper band portion of the second EMI device abuts a first edge of a slot formed in the module housing and the distal ends of each of the spring fingers of the second EMI device abut the second port.

10. The EMI system of claim 9, wherein each of the spring fingers of the second EMI device has at least a first fold formed therein, and wherein a portion of each spring finger of the second EMI device located between the first fold formed in the spring finger of the second EMI device and the distal end of the spring finger formed in the second EMI device abuts a second edge of the slot formed in the module housing.

11. The EMI system of claim 10, wherein when the second EMI device is movably disposed in the module housing and the second port is held in the second port holder, movement of the second port in the second port holder results in movement of at least one of the spring fingers of the second EMI device, wherein movement of the spring finger of the second EMI device is in a direction toward or away from the second port holder.

12. The EMI system of claim 10, wherein when the second EMI device is movably disposed in the module housing and the second port is held in the second port holder, respective electrical pathways exist between the portion of each spring finger of the second EMI device that abuts the second edge of the slot formed in the module housing and the distal end of each spring finger of the second EMI device in contact with the second port.

13. The EMI system of claim 8, wherein the spring fingers of the second EMI device are spaced apart from each other at predetermined spatial intervals such when the second EMI device is movably disposed in the module housing and the second port is held in the second port holder, the distal ends of the respective spring fingers of the second EMI device are in contact with respective locations on the port, wherein the respective locations on the second port that are in contact with the distal ends of the spring fingers of the second EMI device are spaced apart from each other at predetermined spatial intervals, and wherein the predetermined spatial intervals between the locations on the second port that are in contact with the distal ends of the spring fingers of the second EMI device are selected so that the second EMI device acts as a waveguide beyond cutoff for the operating frequency of the optical transceiver module.

14. An optical transceiver module having an electromagnetic interference (EMI) system for providing EMI shielding of one or more optical ports of the transceiver module, the transceiver module comprising:
  a transceiver module housing, the housing comprising an electrically conductive material and having at least a first slot formed therein;
  at least a first EMI device configured to be movably disposed in the first slot formed in the module housing, the first EMI device comprising an electrically conductive first spring structure, wherein when the first EMI device is movably disposed in the module housing, multiple respective locations on the spring structure are in contact with multiple respective locations on the module housing to provide multiple respective electrical pathways between the spring structure and the module housing, the module housing having at least a first port holder formed therein configured to receive and hold a first fiber optic port, the first fiber optic port comprising an electrically conductive material; and
  wherein when the first EMI device is movably disposed in the module housing and the first fiber optic port is held in the first port holder, multiple locations on the first spring structure are in contact with multiple respective locations on the module housing to provide multiple respective electrical pathways between the spring structure and the port, and when the first spring structure is movably disposed within the module housing, the first spring structure is loaded via the contact between first spring structure and the module housing, the loading of the first spring structure ensuring that contact is maintained between the first spring structure and the module housing and between the first spring structure and the first port, wherein the first port holder is configured to hold the first port in a floating arrangement that provides the first port with some freedom to move, and wherein when the first EMI device is movably disposed in the module housing and the first port is held in the first port holder, movement of the port in the first port holder results in movement of the EMI device in the module housing.

15. The optical transceiver module of claim 14, wherein the first EMI device comprises:
  a circular band having an upper band portion and a lower band portion; and
  a plurality of spring fingers extending from the lower band portion of the circular band, each spring finger having a distal end portion, and wherein when the first EMI device is movably disposed in the module housing and the first port is held in the first port holder, the upper band portion abuts a first edge of a slot formed in the module housing and the distal ends of each of the spring fingers are abut the first port.

16. The optical transceiver module of claim 15, wherein each of the spring fingers has at least a first fold formed therein, and wherein a portion of each spring finger located between the first fold formed in the spring finger and the distal end of the spring finger abuts a second edge of the slot formed in the module housing.

17. The optical transceiver module of claim 16, wherein when the first EMI device is movably disposed in the module housing and the first port is held in the first port holder, movement of the port in the port holder results in movement of at least one of the spring fingers, wherein movement of the spring finger is in a direction toward or away from the first port holder.

18. The optical transceiver module of claim 16, wherein when the first EMI device is movably disposed in the module housing and the first port is held in the first port holder, respective electrical pathways exist between the portion of each spring finger that abuts the second edge of the slot formed in the module housing and the distal end of each spring finger in contact with the first port.

19. The optical transceiver module of claim 14, wherein the spring fingers are spaced apart from each other at predetermined spatial intervals such when the first EMI device is movably disposed in the module housing and the first port is held in the first port holder, the distal ends of the respective spring fingers are in contact with respective locations on the port, wherein the respective locations on the port that are in contact with the distal ends of the spring fingers are spaced apart from each other at predetermined spatial intervals, and wherein the predetermined spatial intervals between the locations on the port that are in contact with the distal ends of the spring fingers are selected so that the first EMI device acts as a waveguide beyond cutoff for the operating frequency of the optical transceiver module.

20. A method for providing electromagnetic interference (EMI) shielding of one or more optical ports of the transceiver module, the method comprising:
  providing a transceiver module housing, the housing comprising an electrically conductive material and having at least a first slot formed therein;

movably disposing at least a first EMI device in the first slot formed in the module housing, the first EMI device comprising an electrically conductive first spring structure; and placing at least a first fiber optic port in a first port holder formed in the module housing, the first port comprising electrically conductive material, wherein multiple respective locations on the spring structure are in contact with multiple respective locations on the module housing and with multiple respective locations on the first port, and wherein the first spring structure is loaded via the contact between first spring structure and the module housing, and wherein the loading of the first spring structure ensures that contact is maintained between the first spring structure and the module housing and between the first spring structure and the first port, wherein the first port holder is configured to hold the first port in a floating arrangement that provides the first port with some freedom to move, and wherein when the first EMI device is movably disposed in the module housing and the first port is held in the first port holder, movement of the port in the first port holder results in movement of the first EMI device in the module housing.

21. The method of claim 20, wherein the first EMI device comprises a circular band having a plurality of spring fingers extending from the circular band portion, a portion of the circular band being in contact with an edge of the slot formed in the module housing, and wherein each of the spring fingers has a respective distal end that is in contact with a respective location on the first port, and wherein movement of the first port in the port holder results in movement of at least one of the spring fingers, and wherein contact between the portion of the circular band at the edge of the slot and contact between the distal ends of the spring fingers and the port is maintained despite movement of the port or of the spring fingers.

* * * * *

UNITED STATES PATENT AND TRADEMARK OFFICE
CERTIFICATE OF CORRECTION

PATENT NO. : 7,543,997 B1  Page 1 of 1
APPLICATION NO. : 12/027393
DATED : June 9, 2009
INVENTOR(S) : Larry McColloch It is certified that error appears in the above-identified patent and that said Letters Patent is hereby corrected as shown below:

Column 7, Line 31, Claim 1, delete "sort" and insert --port--.

Signed and Sealed this
Twenty-fifth Day of September, 2012

David J. Kappos
*Director of the United States Patent and Trademark Office*